United States Patent
Paik et al.

(10) Patent No.: US 11,732,162 B2
(45) Date of Patent: Aug. 22, 2023

(54) ANISOTROPIC CONDUCTIVE ADHESIVES FOR THERMO-COMPRESSION BONDING CONTAINING SOLDER CONDUCTIVE PARTICLES AND FLUX ADDITIVES AND METHOD OF CONNECTING ELECTRONIC PARTS USING THE SAME

(71) Applicant: Korea Advanced Institute of Science and Technology, Daejeon (KR)

(72) Inventors: KyoungWook Paik, Daejeon (KR); Jae Hyeong Park, Daejon (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 210 days.

(21) Appl. No.: 16/951,466

(22) Filed: Nov. 18, 2020

(65) Prior Publication Data
US 2021/0261829 A1 Aug. 26, 2021

(30) Foreign Application Priority Data
Feb. 26, 2020 (KR) .................. 10-2020-0023794

(51) Int. Cl.
*C09J 9/02* (2006.01)
*C09J 11/04* (2006.01)
(Continued)

(52) U.S. Cl.
CPC . *C09J 9/02* (2013.01); *C09J 7/35* (2018.01); *C09J 7/385* (2018.01); *C09J 11/04* (2013.01); *C09J 11/06* (2013.01); *C08K 3/10* (2013.01); *C08K 5/42* (2013.01); *C08K 5/55* (2013.01); *C08K 2201/003* (2013.01); *C09J 2203/326* (2013.01); *C09J 2301/314* (2020.08);
(Continued)

(58) Field of Classification Search
CPC ..... C09J 9/00; C09J 9/02; C09J 11/00; C08K 5/42
See application file for complete search history.

(56) References Cited

U.S. PATENT DOCUMENTS

| | | | | |
|---|---|---|---|---|
| 2008/0020157 A1* | 1/2008 | Larson | ................... | C09J 179/08 524/495 |
| 2009/0186962 A1* | 7/2009 | Kondo | ................. | C08G 59/188 523/440 |

FOREIGN PATENT DOCUMENTS

| | | | | |
|---|---|---|---|---|
| JP | 2005056736 A | * | 3/2005 | ............... B41N 1/02 |
| KR | 20060094157 A | * | 8/2006 | ................ C09J 9/02 |

(Continued)

OTHER PUBLICATIONS

Park et al., "Low-Temperature Bonding of PZT (PbZrTiO$_3$) and Flexible Printed Circuits Using Sn52In Solder Anisotropic Conductive Films for Flexible Ultrasonic Transducers," IEE Transactions on Components, Packaging and Manufacturing Technology 9(11):2152-2159 (2019) (9 pages).

(Continued)

*Primary Examiner* — Khanh T Nguyen
(74) *Attorney, Agent, or Firm* — Clark & Elbing LLP; Susan M. Michaud

(57) ABSTRACT

Disclosed are an anisotropic conductive adhesives for thermo-compression bonding containing solder conductive particles and flux additives and a method of connecting electronic parts using the same. The anisotropic conductive adhesives for thermo-compression bonding may include a flux activator, solder particles and polymer resin.

6 Claims, 23 Drawing Sheets

(51) Int. Cl.
  *C09J 11/06* (2006.01)
  *C09J 7/35* (2018.01)
  *C09J 7/38* (2018.01)
  *C08K 5/42* (2006.01)
  *C08K 3/10* (2018.01)
  *C08K 5/55* (2006.01)

(52) U.S. Cl.
  CPC ...... *C09J 2301/408* (2020.08); *C09J 2433/00* (2013.01); *C09J 2463/00* (2013.01)

(56) References Cited

FOREIGN PATENT DOCUMENTS

| KR | 10-2013-0133342 A | 12/2013 | | |
|----|-------------------|---------|---|---|
| KR | 10-2018-0020520 A | 2/2018  | | |
| WO | WO2004045027 A * | 5/2004 | ............. | C09J 11/00 |
| WO | WO 2009014353 A2 * | 1/2009 | ............. | C08K 5/17 |
| WO | WO2016068444 A1 * | 5/2016 | ............. | H01B 1/22 |

OTHER PUBLICATIONS

Kim et al., "Effect of Flux Activators on the Solder Wettability of Solder Anisotropic Conductive Films," IEEE T. Comp. Pack. Man. 5(1):3-8 (2015).
Office Action dated Apr. 22, 2021 for Korean Patent Application No. 10-2020-0023794, Paik et al., "Anisotropic Conductive Adhesives for Thermo-Compression Bonding Containing Solder Conductive Particles and Flux Additives and Method of Connecting Electronic Parts Using the Same," filed Feb. 26, 2020 (4 pages).

* cited by examiner

Room temperature ⟶ High temperature

FIG. 14

|  | | PZT(dummy) | FPCs |
|---|---|---|---|
| Material | | Silicon | Polyimide |
| Thickness | | 150 μm | 55 μm |
| Design | Pitch | | 500 μm |
| | Finish | Au | ENIG (Electroless Ni Immersion Gold) |
| | Image | | Bonding area |

ANISOTROPIC CONDUCTIVE ADHESIVES FOR THERMO-COMPRESSION BONDING CONTAINING SOLDER CONDUCTIVE PARTICLES AND FLUX ADDITIVES AND METHOD OF CONNECTING ELECTRONIC PARTS USING THE SAME

CROSS REFERENCE TO RELATED APPLICATION

This application claims priority under 35 U.S.C. § 119 to Korean Patent Application No. 10-2020-0023794 filed on Feb. 26, 2020, which is incorporated herein by reference in its entirety.

BACKGROUND OF THE INVENTION

1. Technical Field

The following description relates to anisotropic conductive is adhesives for thermo-compression bonding containing solder conductive particles and flux additives, and a method of connecting electronic parts using the same.

2. Description of the Related Art

With the rapid development of the digital network information society, mobile information terminals require functions, such as high performance, multi-functioning (e.g., convergence and complexation), a smaller size, lightweight, and the acceleration of an information processing speed. In particular, selecting a technology for a smaller size corresponding to needs for a change in the fabrication technology according to a smaller size of an electronic device becomes a very important factor, and has been in the spotlight as an important factor of business.

As the smaller size becomes important as described above, anisotropic conductive adhesives (ACAs), that is, an electrical connection material capable of reducing a package size and an interval between electrodes, is used for an electrical connection between parts within an electronic device, instead of the existing socket type connector having a large volume and having a wide interval between electrodes. The ACAs are composed of fine conductive particles and a thermosetting resin. In a process of connecting electronic parts, when heat and pressure are applied between two boards with the ACAs Interposed therebetween, a resin exits between the electrodes and thus conductive particles are captured between the electrodes. At this time, the cured resin enables mechanical bonding between the two boards, and the captured conductive particles enable an electrical connection between the two boards. Today metal balls, such as nickel balls, or polymer balls plated with nickel or gold are chiefly used as conductive particles.

Such metal particles form physical bonding between electrodes. However, as the ACAs are increasingly used, there is a need for ACA bonding having higher reliability. In line with such needs, the existing metal particles are replaced with solder particles, and solder oxides hindering solder wetting removed by ultrasonic bonding, enabling bonding based on a metal alloy between the solder and the electrode. Such bonding has advantages in that this replaces the existing physical bonding with a metallurgical joint, shows high reliability and high current carrying, and is also not sensitive to substrate flatness through solder melting.

However, the ultrasonic bonding has problems in that it may damage a board due to ultrasonic vibration and has a high cost for ultrasonic generation equipment.

PRIOR ART DOCUMENT

Korean Patent Application Publication No. 10-2018-0020520

SUMMARY OF THE INVENTION

Embodiments may provide an anisotropic conductive adhesives for thermo-compression bonding containing solder conductive particles and flux additives, and a method of connecting electronic parts using the same.

In an embodiment, there are provided anisotropic conductive adhesives for thermo-compression bonding, including thermal acid generators, solder particles, and a polymer resin.

According to an aspect, in a thermo-compression process of electrically connecting parts within an electronic device using the anisotropic conductive adhesives for thermo-compression bonding, acid generated from the thermal acid generators due heat in the thermo-compression process may remove solder oxides generated from the solder particles due to heat in the thermo-compression process.

According to another aspect, in a thermo-compression process of electrically connecting parts within an electronic device using the anisotropic conductive adhesives for thermo-compression bonding, the solder particles from which the solder oxides have been removed may form a metallurgical joint between electrodes between the parts.

According to still another aspect, the thermal acid generator may include at least one of trifluoromethanesulfonic acid ($CF_3SO_3H$), dinonylnaphthalene disulfonic acid ($C_{28}H_{44}O_6S_2$), dinonylnaphthalene sulfonic acid ($C_{28}H_{44}O_3S$), p-toluenesulfonic acid ($C_7H_8O_3S$), dodecylbenzenesulfonic acid ($C_{18}H_{30}O_3S$), hexafluoroantimonate ($SbF_6$), perfluorobutanesulfonic acid ($C_4HF_9O_3S$), bis(trifluoromethanesulfonyl) imide ($C_2F_6NO_4S_2$), and tetrakis (pentafluorophenyl) borate ($C_{24}BF_{20}$).

According to still another aspect, an activation temperature of the thermal acid generator may be 60° C. or more to less than 240° C.

According to still another aspect, the solder particles may include particles containing at least one Sn element of Sn, Sn3Ag0.5Cu (SAC305), Sn0.4Ag57.6Bi, Sn58Bi, and Sn52In or comprise particles coated with the at least one Sn element.

According to still another aspect, the diameter of each of the solder particles may be less than 100 μm.

According to still another aspect, a melting point of the solder particle may be 60° C. or more to less than 240° C.

According to still another aspect, the polymer resin may include a thermosetting resin having a solid phase or a liquid phase.

According to still another aspect, the polymer resin may include at least one of acrylic resin, cation epoxy resin, and imidazole epoxy resin.

In an embodiment, there is provided a method of connecting electronic parts, including forming a liquid polymer layer by coating, through a comma roll, a polymer solution in which thermal acid generators and solder particles are mixed, fabricating anisotropic conductive adhesives for thermo-compression bonding comprising a solid polymer layer by drying the liquid polymer layer, and disposing the anisotropic conductive adhesives for thermo-compression bonding between parts to be electrically connected within an electronic device and thermally compressing the anisotropic conductive adhesives.

BRIEF DESCRIPTION OF THE DRAWINGS

FIG. 14 is a table illustrating the specifications of test means used for a pressure cooker test and corresponding images according to an embodiment of the present disclosure.

DETAILED DESCRIPTION

The present disclosure may be modified in various ways and may have various embodiments. Specific embodiments are hereinafter described in detail with reference to the accompanying drawings.

In describing the present disclosure, a detailed description of the known functions and constructions will be omitted if it is deemed to make the gist of the present disclosure unnecessarily vague.

Figure 1:
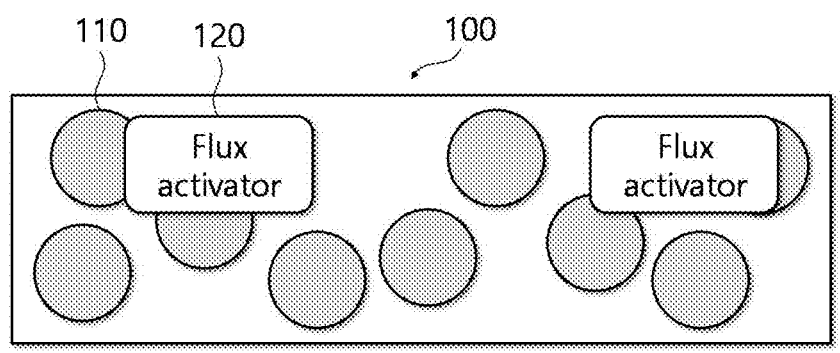
FIG. 1 is a diagram illustrating a schematic shape of solder ACAs to which a flux activator has been added according to an embodiment of the present disclosure.

FIG. 1 is a diagram illustrating a schematic shape of solder anisotropic conductive adhesives (ACAs) to which a flux activator has been added according to an embodiment of the present disclosure. FIG. 1 illustrates a schematic shape of ACAs 100 according to an embodiment of the present disclosure. The ACAs 100 may further include thermal acid generators (e.g., flux activators) 120 for removing solder oxides, in addition to solders 110.

Figure 2:
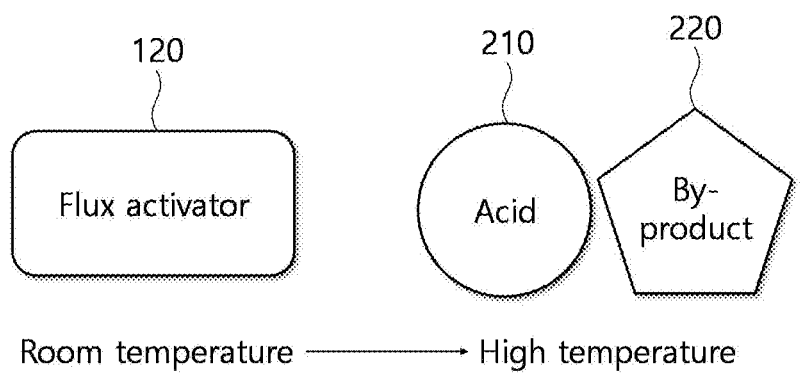
FIG. 2 is a diagram illustrating an example of the attributes of a thermal acid generator at room temperature and high temperature according to an embodiment of the present disclosure.
Figure 3:
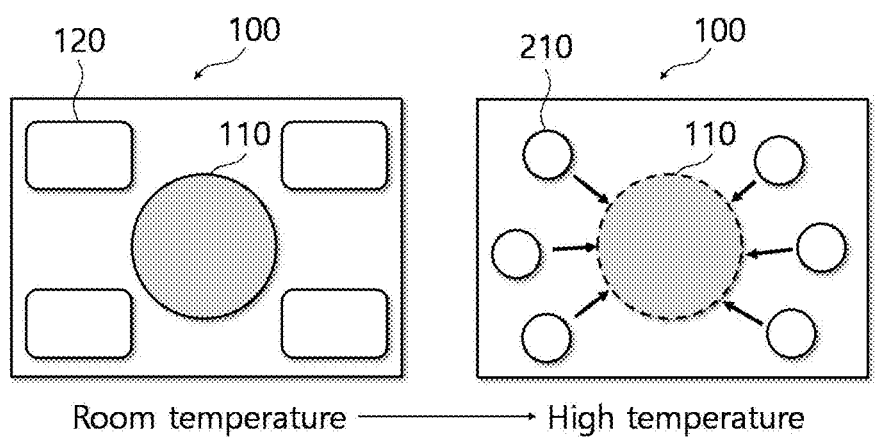
FIG. 3 is a diagram illustrating a schematic shape of the solder ACAs to which thermal acid generators have been added at room temperature and high temperature according to an embodiment of the present disclosure.

FIG. 2 is a diagram illustrating an example of the attributes of a thermal acid generator at room temperature and high temperature according to an embodiment of the present disclosure. FIG. 3 is a diagram illustrating a schematic shape of the solder ACAs to which thermal acid generators have been added at room temperature and high temperature according to an embodiment of the present disclosure. As illustrated in FIG. 2, the thermal acid generator (e.g., flux activator) 120 described with reference to FIG. 1 shows neutrality at room temperature, but may generate acid 210 and a by-product 220 at a high temperature. In this case, as illustrated in FIG. 3, the thermal acid generator 120 showing neutrality at room temperature does not influence the epoxy of the ACAs. However, at a high temperature, the acid 210 generated by the thermal acid generator 120 may function as a flux to remove oxides of the solder 110. Accordingly, in a thermo-compression bonding process using the ACAs 110, the solders 110 may help a metallurgical joint.

The thermal acid generator 120 may include at least one of trifluoromethanesulfonic acid ($CF_3SO_3H$), dinonylnaphthalene disulfonic acid ($C_{28}H_{44}O_6S_2$), dinonylnaphthalene sulfonic acid ($C_{28}H_{44}O_3S$), p-toluenesulfonic acid ($C_7HSO_3S$), dodecylbenzenesulfonic acid ($C_{18}H_{30}O_3S$), hexafluoroantimonate ($SbF_6$), perfluorobutanesulfonic acid ($C_4HF_9O_3S$), bis(trifluoromethanesulfonyl) imide ($C_2F_6NO_4S_2$), and tetrakis(pentafluorophenyl) borate ($C_{24}BF_{20}$). Furthermore, an activation temperature of the thermal acid generator 120 may be 60° C. or more to less than 240° C.

The solder 110 may include particles containing at least one Sn element of Sn, Sn3Ag0.5Cu (SAC305), Sn0.4Ag57.6Bi, Sn58Bi, and Sn52In or may include particles coated with the at least one Sn element. In this case, the diameter of the solder 110 may be less than 100 μm. The melting point of the solder 110 may be 60° C. or more to less than 240° C.

Furthermore, a polymer resin used to fabricate the solder ACAs may include a thermosetting resin having a solid phase or a liquid phase. For example, the polymer resin may include at least one of an acrylic resin, a cation epoxy resin, and an imidazole epoxy resin.

Figure 4:
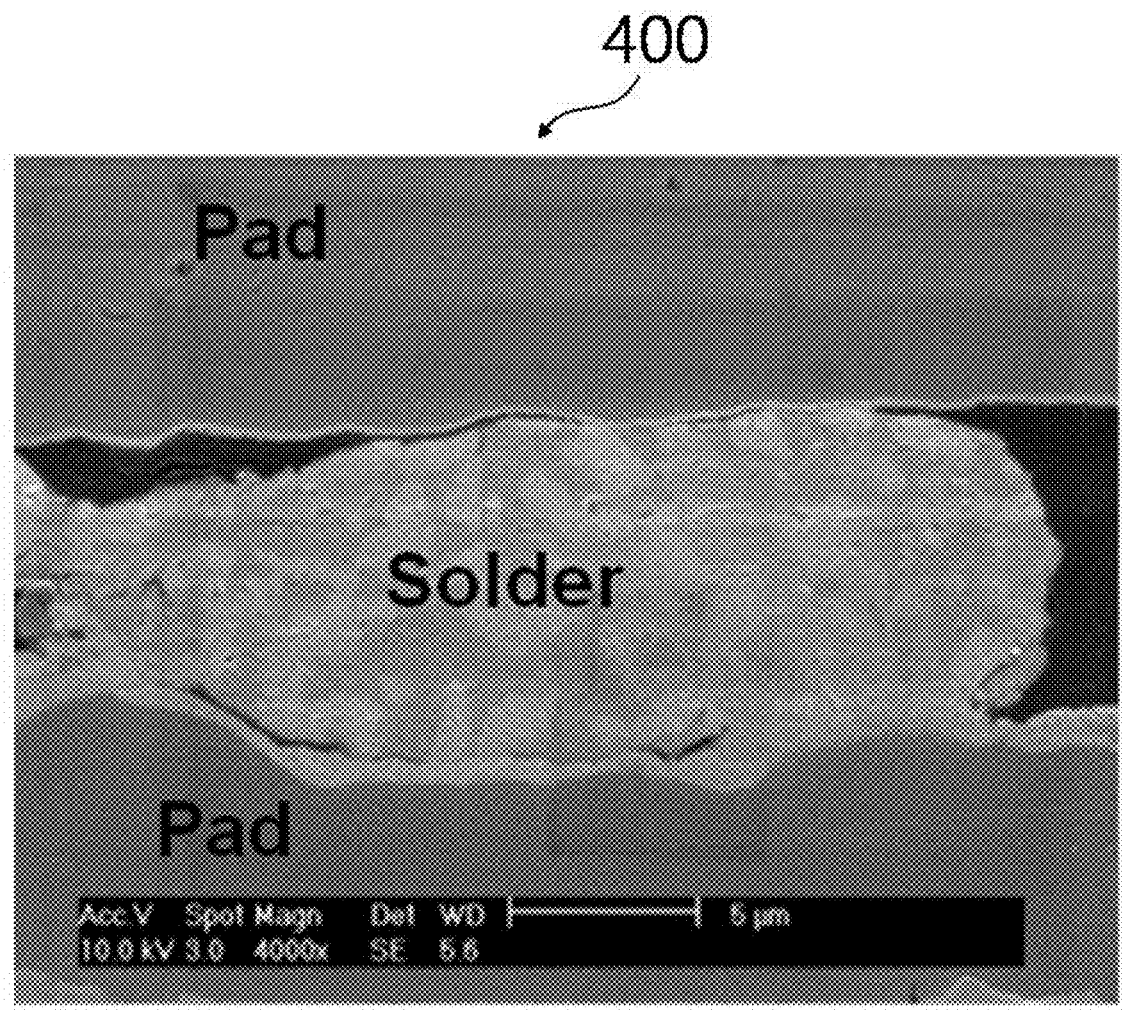
FIG. 4 is an image illustrating an example of a solder joint shape using solder ACAs to which a thermal acid generator has not been added.
Figure 5:
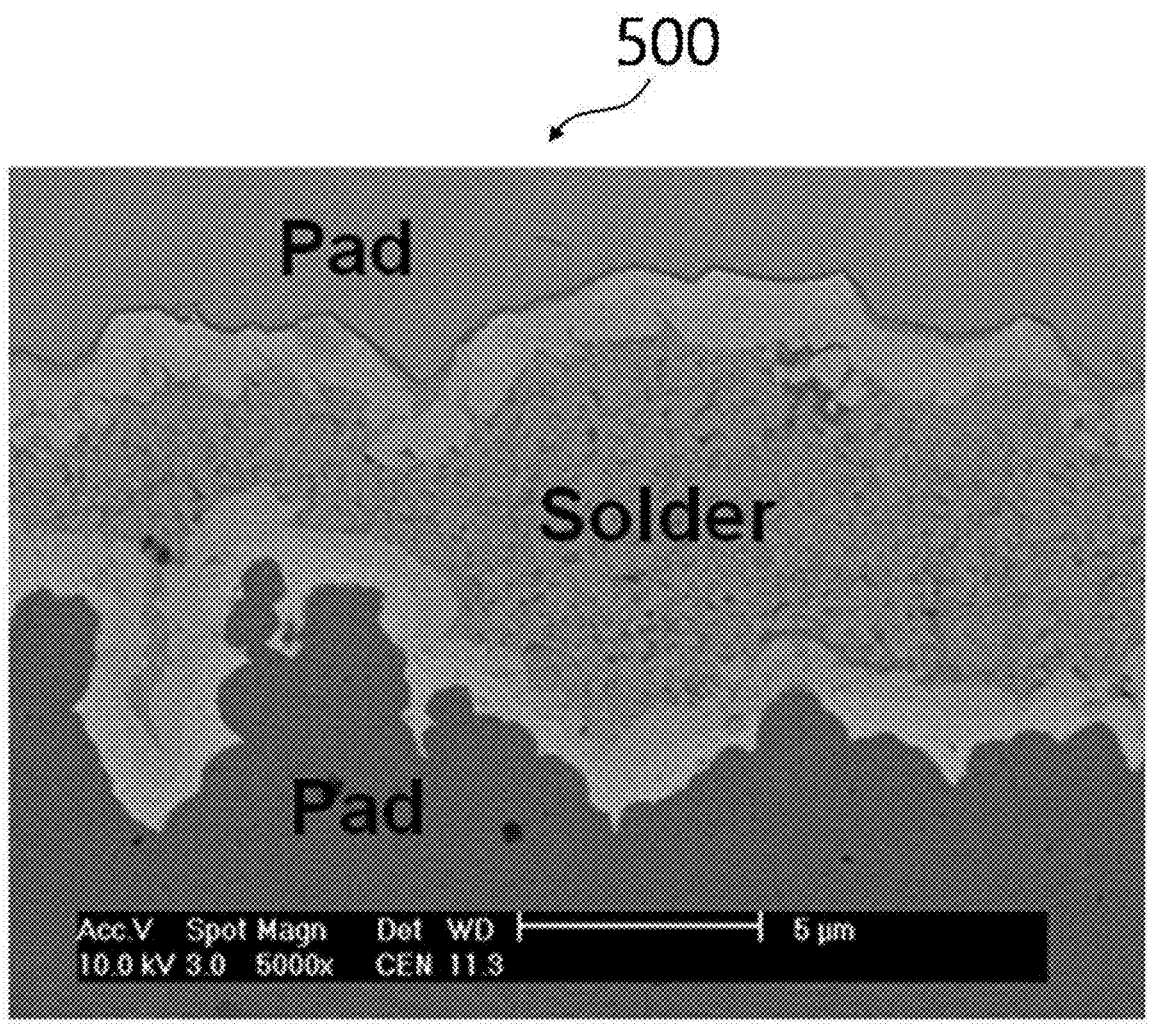
FIG. 5 is an image illustrating an example of a solder joint shape using solder ACAs to which thermal acid generator have been added.

FIG. 4 is an image illustrating an example of a solder joint shape using solder ACAs to which a thermal acid generator has not been added. FIG. 5 is an image illustrating an example of a solder joint shape using solder ACAs to which thermal acid generator have been added. An image 400 of FIG. 4 shows that a solder simply forms a physical contact between pads through a thermo-compression bonding process of solder ACAs to which the thermal acid generator has not been added. In contrast, an image 500 of FIG. 5 shows that a solder forms a metallurgical joint because acid generated from the thermal acid generators removes solder oxides in a thermo-compression bonding process of the solder ACAs to which the thermal acid generator has been added.

Figure 6:
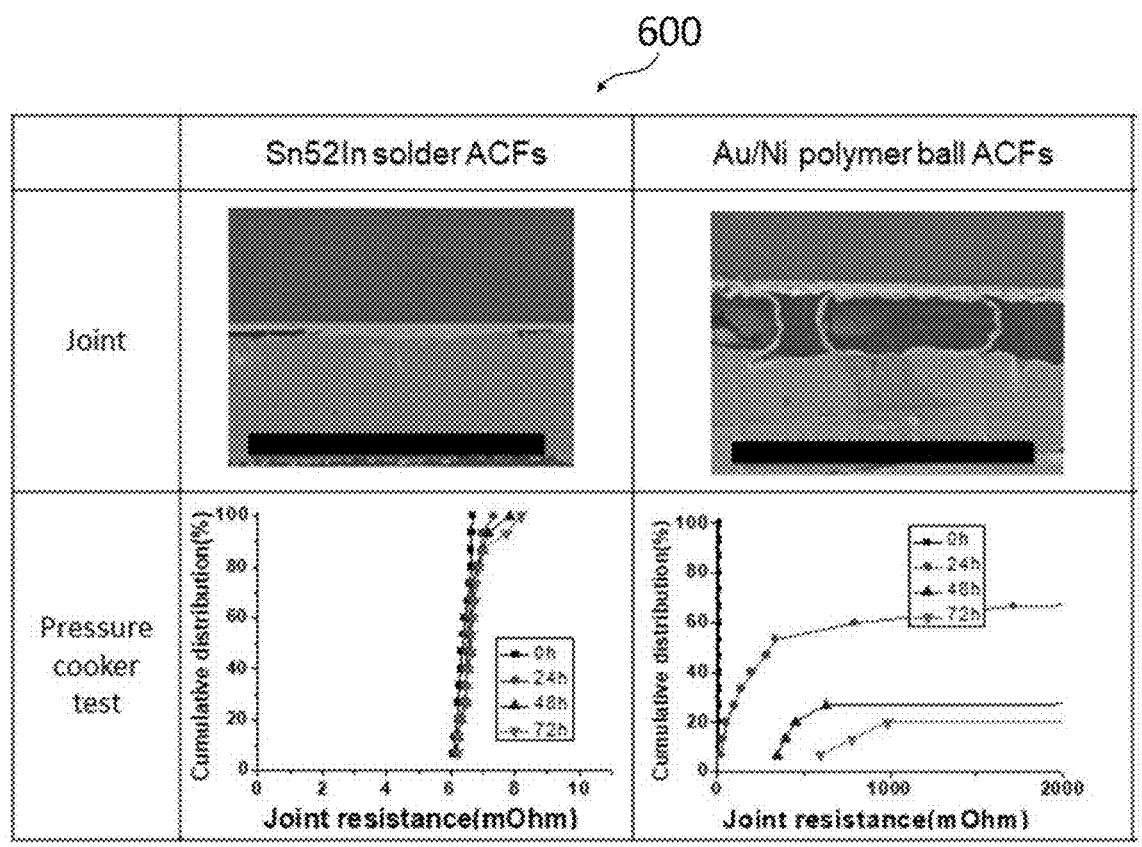
FIG. 6 is a diagram illustrating an example of the results of a comparison between experiments related to the reliability of the existing ACAs and the reliability of the solder ACAs to which thermal acid generator have been added according to an embodiment of the present disclosure.

FIG. 6 is a diagram illustrating an example of the results of a comparison between experiments related to the reliability of the existing ACAs and the reliability of the solder ACAs to which thermal acid generator have been added according to an embodiment of the present disclosure. FIG. 6 illustrates bonding images of the existing ACAs containing polymer balls with which gold (Au) and nickel (Ni) were plated and the solder ACAs to which the thermal acid generator has been added, and the results of a pressure cooker test for the existing ACAs and the solder ACAs. The results of the pressure cooker test show that a metallurgical joint formed using ACAs to which the thermal acid generator and an Sn52In solder were added according to an embodiment of the present disclosure maintains very stable electrical resistance even after 72 hours.

Hereinafter, more detailed embodiments are described below.

The ACAs according to an embodiment of the present disclosure may be implemented in the form of an ACF, including conductive solder particles, a polymer resin, and a thermal acid generator as a thermal acid generator. As already described above, the thermal acid generator may remove the solder oxides of the solder particles by generated acid for solder wetting in a thermo-compression bonding process.

In the following embodiment, in order to reduce an ACF bonding temperature less than 130° C., conductive solder particles (Tm=118° C.) were used in a solder ACF. A new Sn52In solder ACF was fabricated using a comma-roll film coater and used to interconnect gold (Au) coating PZT (PbZrTiO3) and a flexible printed circuit (FPC). It could be successfully proved that the interconnection between the PZT and the FPC using the Sn52In solder ACF form reliable electrical resistance along with an excellent solder bonding part. The analysis of energy dispersive spectrometer (EDS) line scans revealed excellent solder wetting because a metallic compound (IMC) was present between gold (Au)-indium (In) and nickel (Ni)-tin (Sn) at the interface of the PZT and the FPC. The Sn52In solder ACF joint showed excellent metal bonding (2 atm at relative humidity 100% and 121° C.) during a pressure cooker test, and an open circuit failure attributable to a dynamic bending reliability test (e.g., a minimum bending radius of 7 mm) not appeared. Accordingly, the Sn52In solder ACF bonding may provide an excellent metal connection for an electrical connection between parts within an electronic device.

A. Materials for Sn52In Solder ACF

Figure 7:
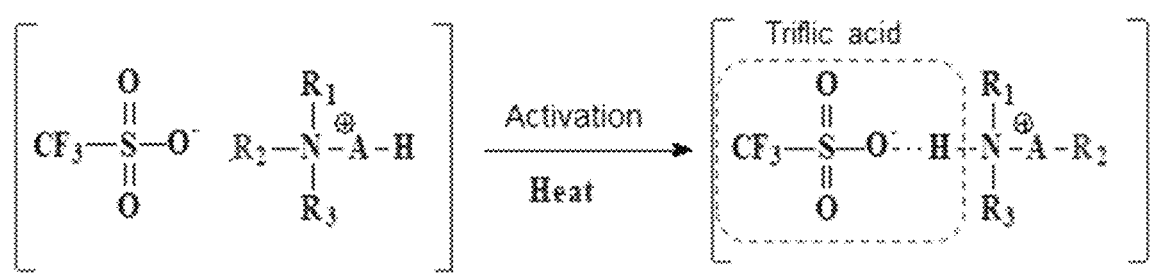
FIG. 7 is a diagram illustrating the activity response of the flux activator according to an embodiment of the present disclosure.
Figure 8:
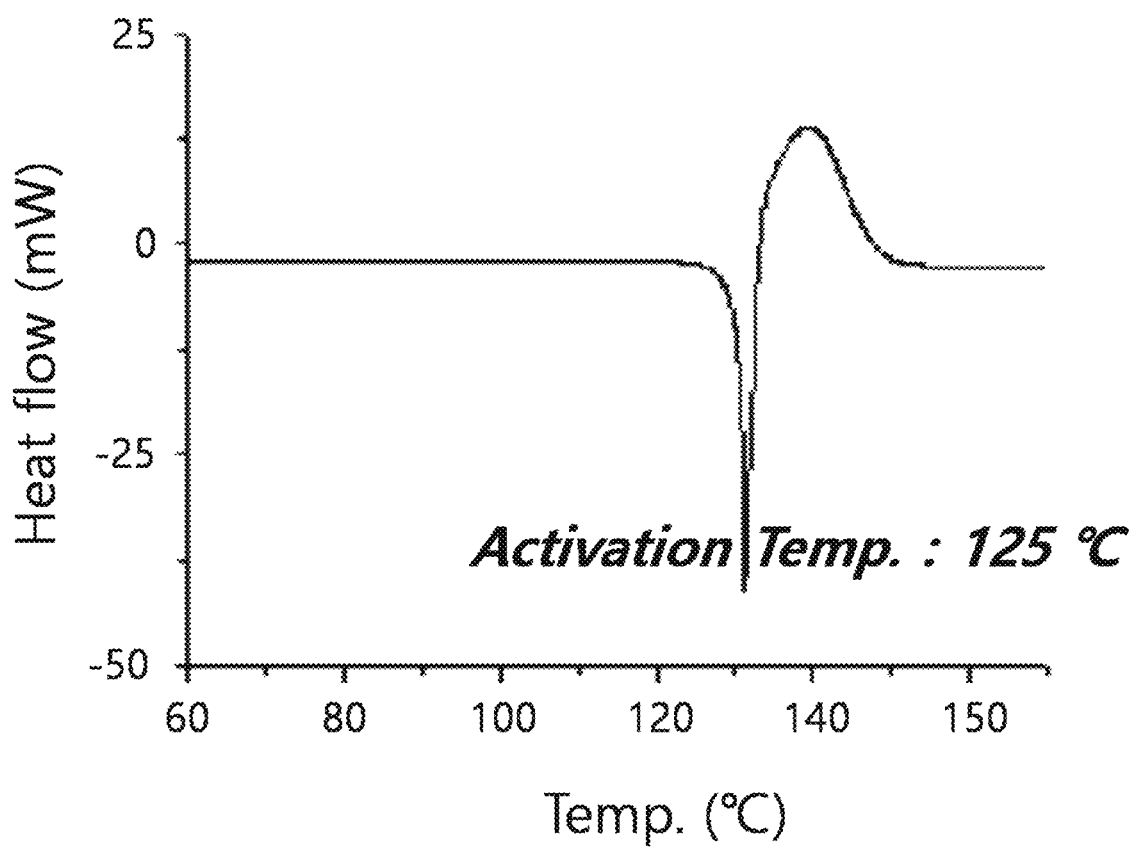
FIG. 8 is a graph illustrating an activation temperature of the flux activator according to an embodiment of the present disclosure.
Figure 9:
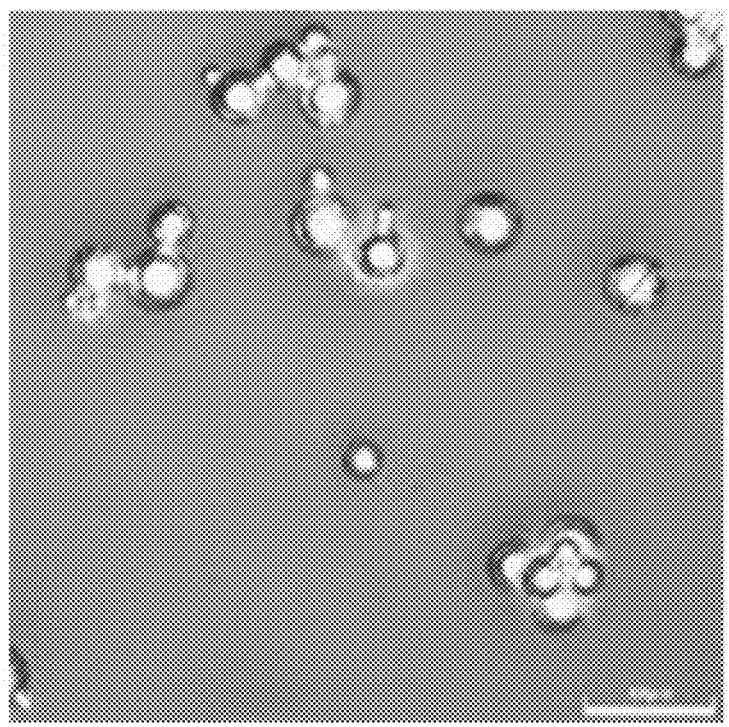
FIG. 9 is an image illustrating the solder balls according to an embodiment of the present disclosure.
Figure 10:
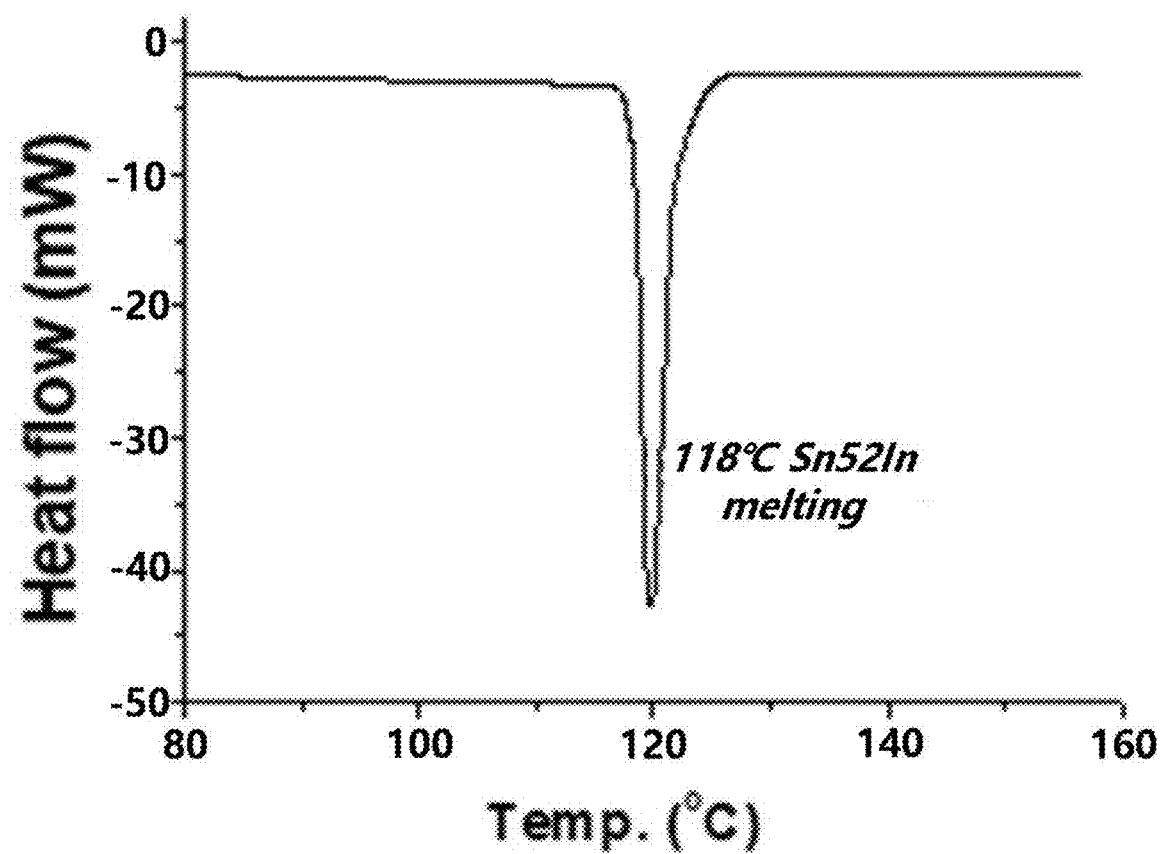
FIG. 10 is a graph illustrating melting points of Sn52In solders according to an embodiment of the present disclosure.
Figure 11:
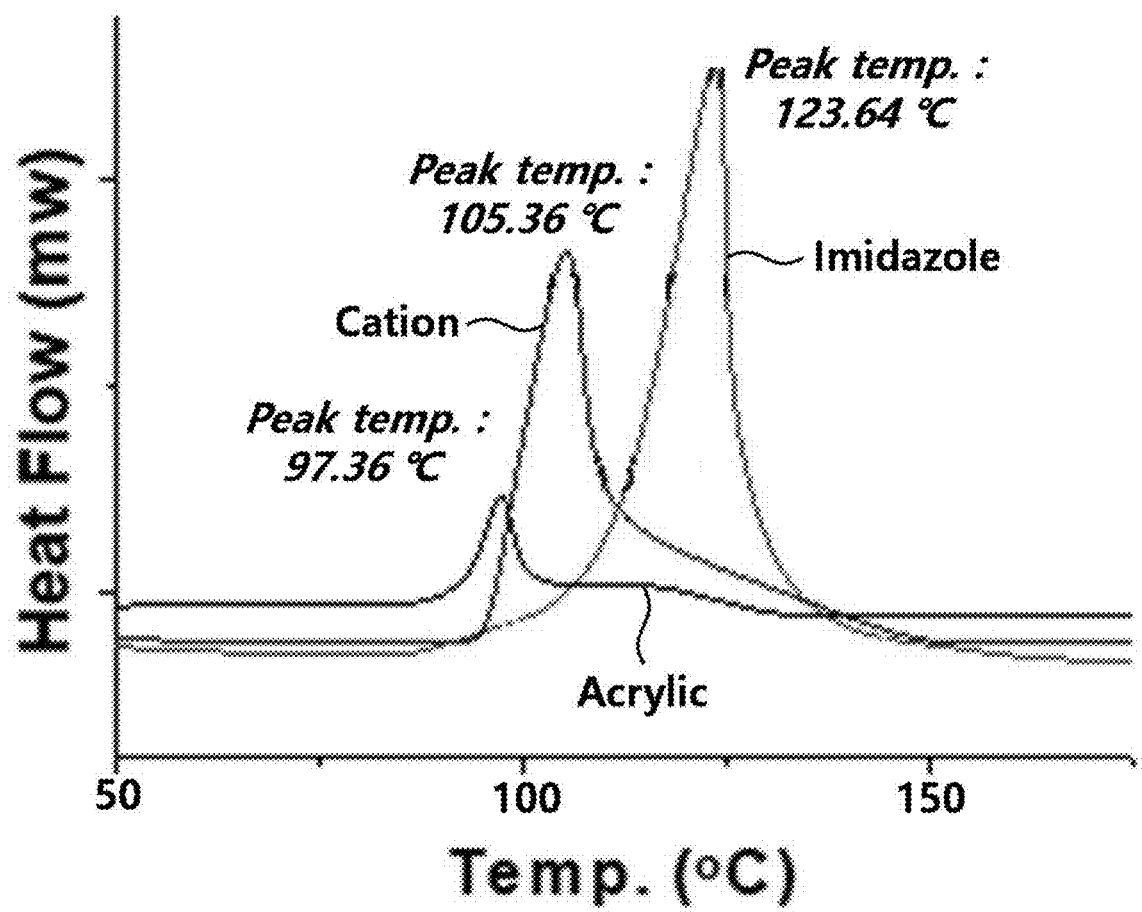
FIG. 11 is a graph illustrating DSC results of three types of polymer resins according to an embodiment of the present disclosure.
Figure 12:
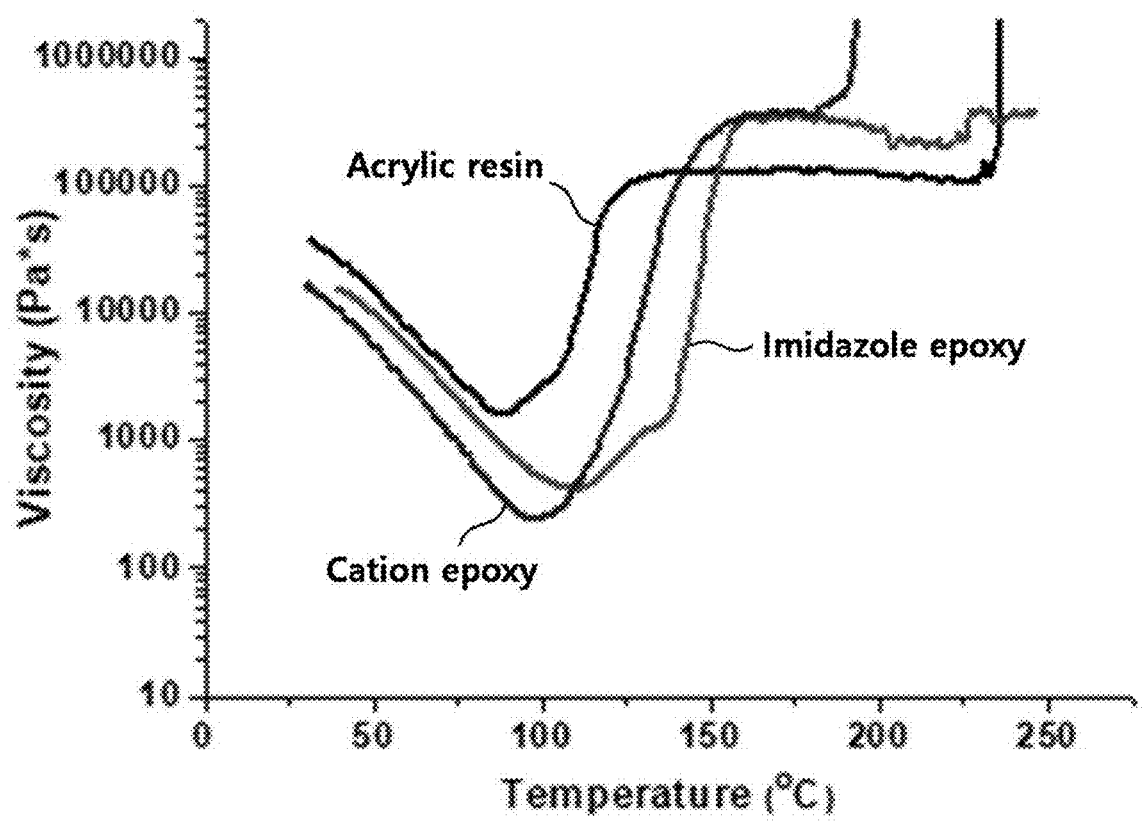
FIG. 12 is a graph illustrating the results of viscosities of the three types of polymer resins according to an embodiment of the present disclosure.
Figure 13:
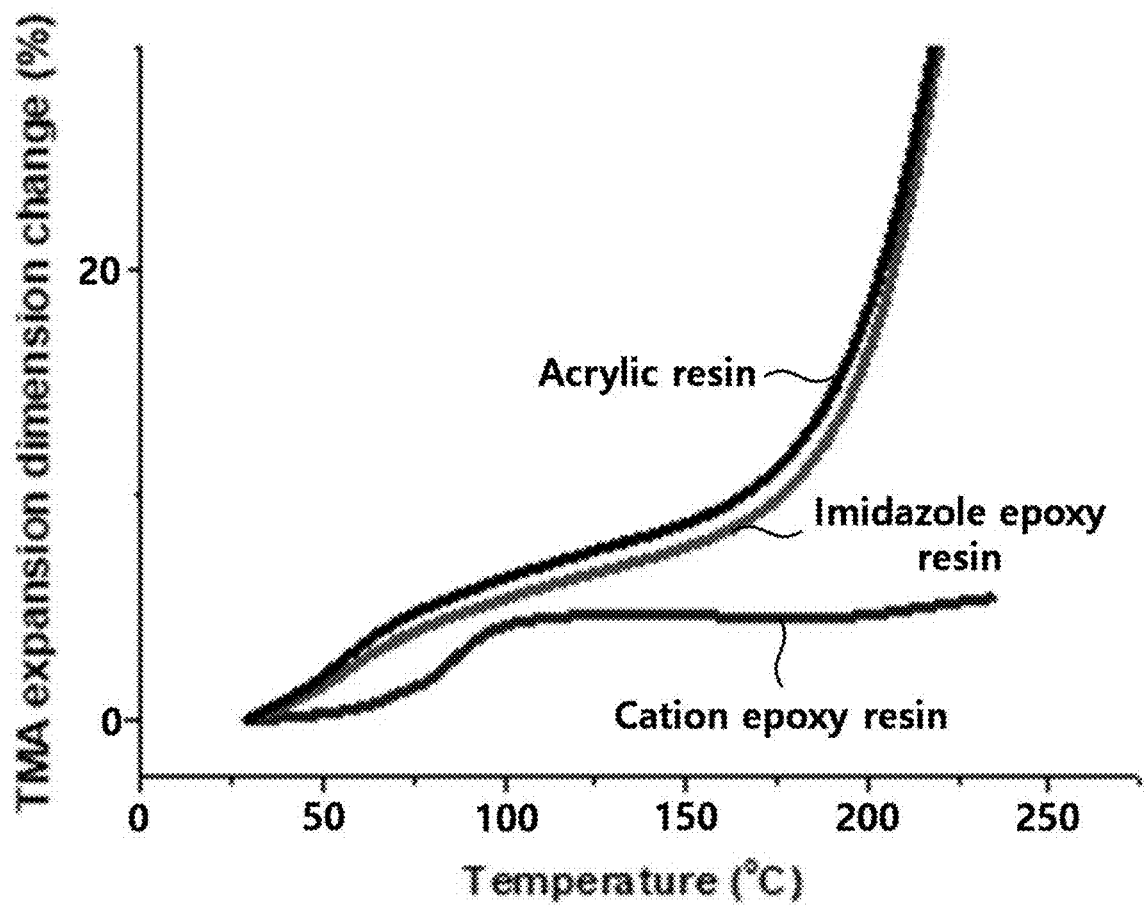
FIG. 13 is a graph illustrating thermal expansion characteristics of the three types of polymer resins according to an embodiment of the present disclosure.

In order to process an Sn52In solder ACF, flux activators, Sn52In solder particles, and a polymer resin using a curing agent were prepared. The flux activator is a kind of thermal acid generator. Triadic acid ($CF_3SO_3H$) showing an activity response, such as FIG. 7, may be generated and used as the flux activator. An activation temperature of the flux activator used in the present embodiment was about 125° C. as illustrated in FIG. 8. The Sn52In solder particles were supplied from Indium Co. The diameter of an Sn52In solder ball was less than 20 μm as in FIG. 9. The melting point of the Sn52In solder was about 118° C. as in FIG. 10. Basic materials of the Sn52In solder ACF were mixed together. Finally, an Sn52In solder ACF film was fabricated using a comma-roll film coater, and has a film thickness of about 30 μm. In order to find out a polymer resin most suitable for the Sn52In solder ACF, three types of polymer resins (e.g., acrylic resin, cation epoxy resin, and imidazole epoxy resin) as an adhesion matrix of the Sn52In solder ACF were individually tested. The results of differential scanning calorimetry (DSC) and viscosities of the three types of polymer resins were measured using DSC and a flowmeter as in FIGS. 11 and 12. The thermo dynamical properties of the polymer resin were also measured by a thermo-mechanical analyzer (TMA). FIG. 13 and Table 1 below show thermo dynamical properties and water absorption factors of various polymer resins.

TABLE 1

| Polymer Resin | CTE 1 (ppm/° C.) | Tg (° C.) | CTE 2 (ppm/° C.) | Water absorption rate (wt. %) |
|---|---|---|---|---|
| Acrylic | 1115 | 53.4 | 1410 | 4.5 |
| Cation | 99 | 82.6 | 1204 | 2.6 |
| Imidazole | 643 | 52.5 | 1089 | 8.3 |

Furthermore, in order to compare the Sn52In solder ACF and the existing ACF in terms of reliability performance, a 10-μm gold (Au)/nickel (Ni) coating polymer ball ACF and an 8-μm nickel (Ni) ACF were also fabricated. Table 2 below summaries the specifications of the fabricated ACFs.

TABLE 2

|  | Conventional ACFs | | Solder ACFs |
|---|---|---|---|
| Particle | Ni ball | Polymer ball (Au/Ni coated) | Solder ball (Sn52In) |
|  | 35 wt. % | 15 wt. % | 35 wt. % |
|  | 8 μm | 20 μm | 20 μm |
| Resin | Acrylic, Cation epoxy, Imidazole epoxy Total 9 kinds of ACFs | | |

B. Characteristics of Sn52In Solder ACF

Figure 15:
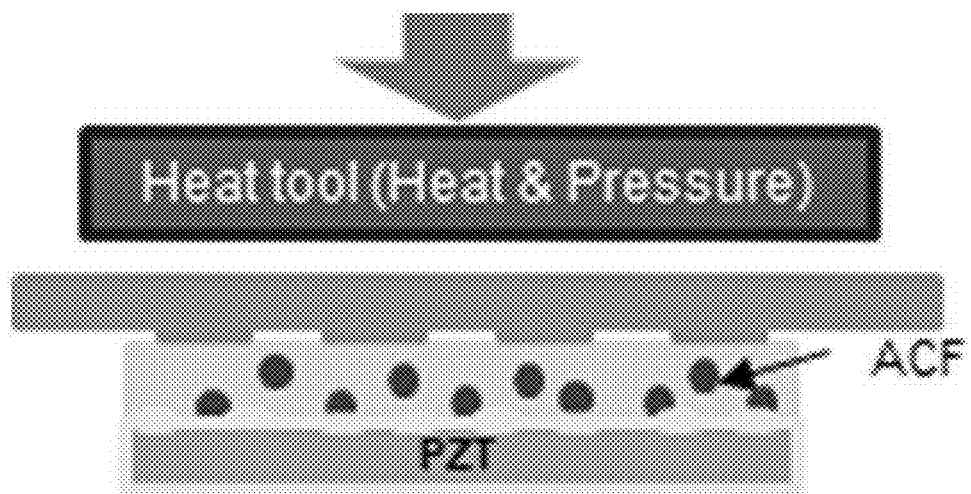
FIG. 15 is a diagram illustrating a thermo-compression bonding process according to an embodiment of the present disclosure.
Figure 16:
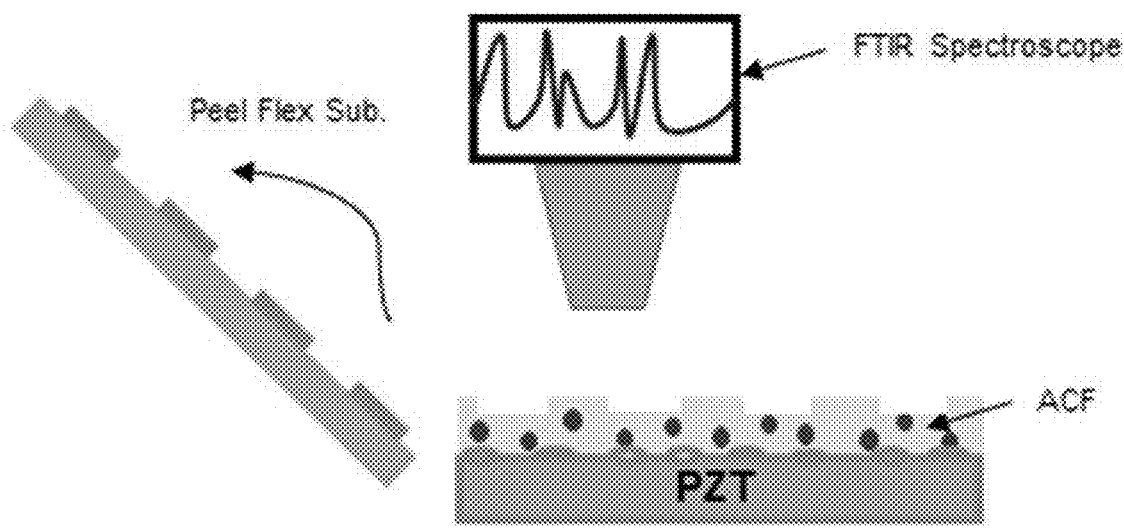
FIG. 16 is a diagram illustrating an FTIR scan process for an ACF polymer resin after thermo-compression bonding according to an embodiment of the present disclosure.
Figure 17:
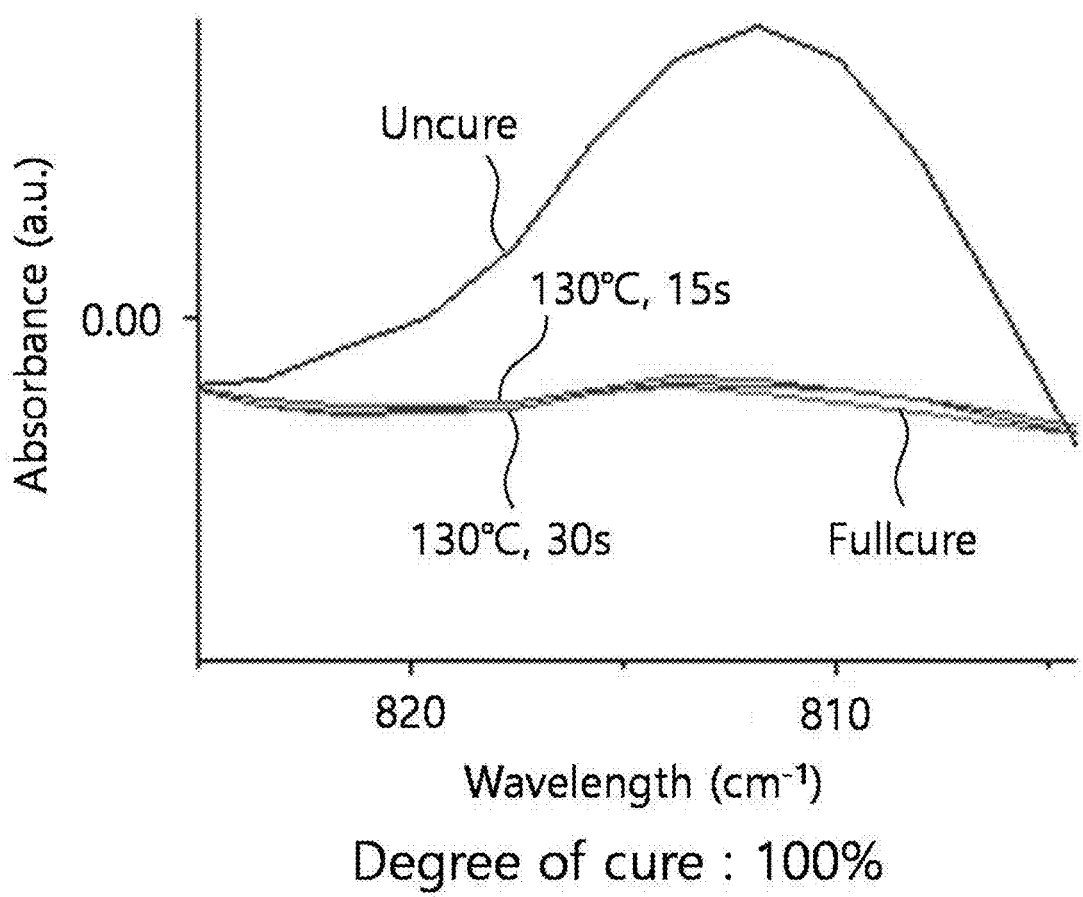
FIGS. 17 to 19 are graphs illustrating the FTIR results of an acrylic resin, a cation epoxy resin and an imidazole epoxy resin according to an embodiment of the present disclosure.
Figure 18:
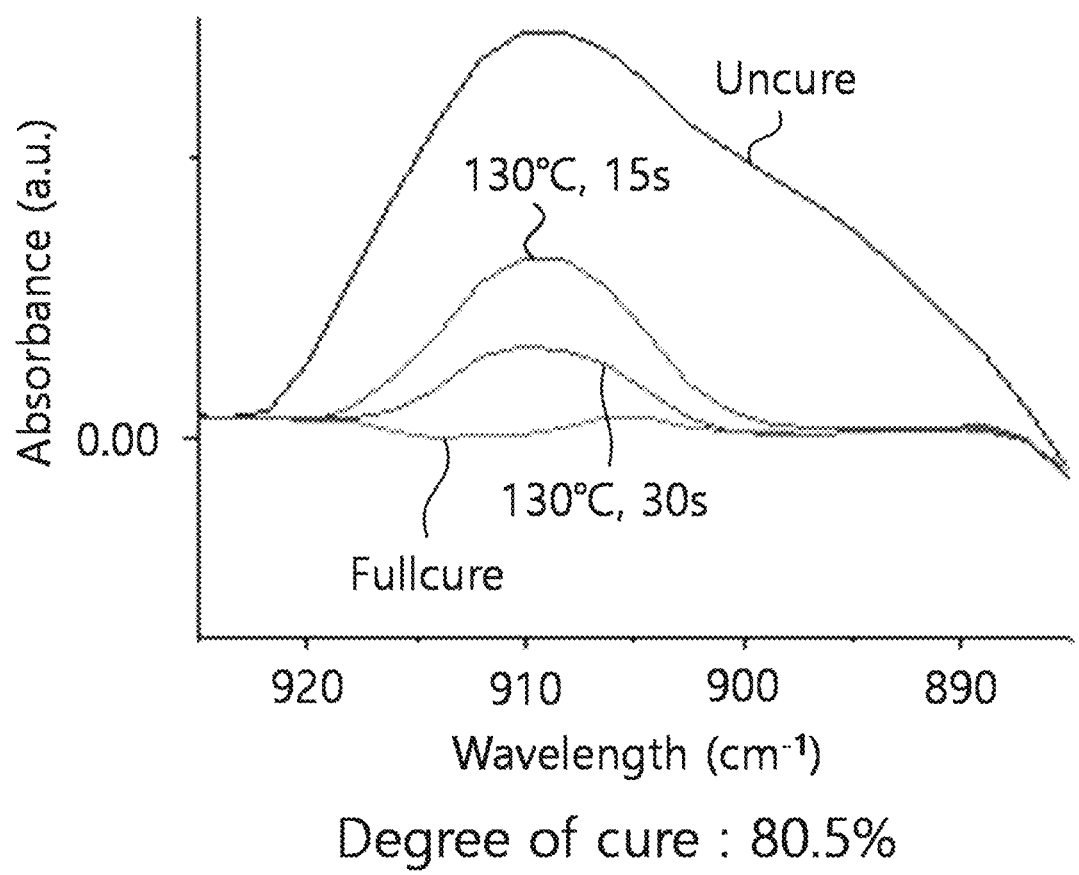
Figure 19:
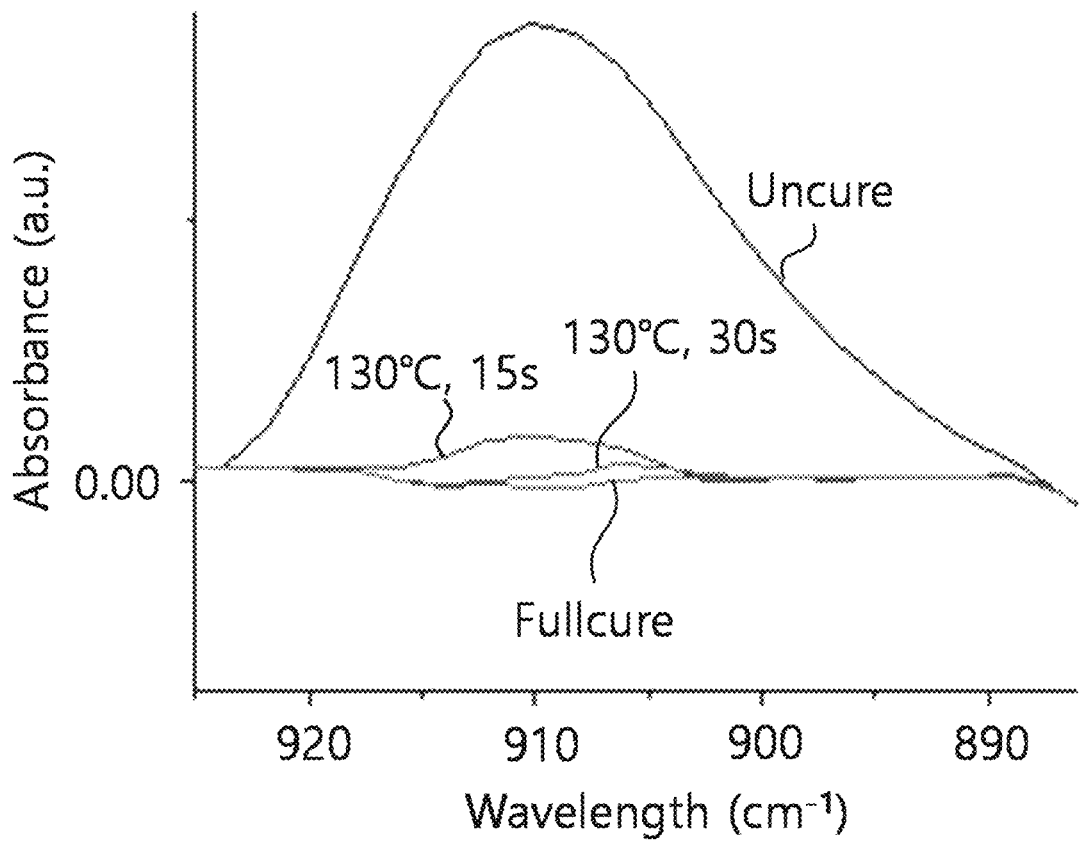

In order to evaluate the reliability of the Sn52In solder ACF, a gold (Au) coating dummy silicon (Si) chip having a 1 mm×20 mm size was prepared, and simulated gold (Au) coating PZT ceramic. Furthermore, before and after a pressure cooker test, a 500-μm pitch FPC was prepared to have a 4-point Kelvin structure in order to measure electrical contact resistance of a single ACF joint. FIG. 14 illustrates the specifications of test means used for a pressure cooker test and corresponding images. Furthermore, as in FIG. 15, the ACFs were stacked on an Au coating dummy Si chip using a roll laminator, and were positioned at the bottom during thermo-compression bonding. Furthermore, in order to guarantee a PZT temperature of 130° C. or less, the FPC was positioned at the top. A condition for the ACF thermo-compression was optimized with pressure of 2 MPa at 130° C. for 30 seconds. A degree of curing of the polymer resin affects the reliability of the ACF joint and commonly needs to be at least 80% after the thermo-compression bonding. The degree of curing of each of the three types of polymer resins was calculated as in Equation 1 using a Fourier transform infrared spectroscopy (FTIR) spectroscope, such as that of FIG. 16.

$$\gamma(IR, \text{epoxy}) = 1 - \frac{A(910, t) - A(910, \gamma)}{A(910, 0) - A(910, \gamma)} \qquad (1)$$

$$\delta(IR, \text{acrylic}) = 1 - \frac{A(810, t) - A(810, \delta)}{A(810, 0) - A(810, \delta)}.$$

wherein γ(IR, epoxy), A(910,0), A(910,t) and A(910, γ) may correspond to a degree of curing of an epoxy resin, a stretching C—O absorbance peak prior to thermo-compression bonding, a stretching C—O absorbance peak after the thermo-compression bonding, and full curing for 3 hours at 150° C., respectively. δ(IR, acrylic), A(810,0), A(810,t), and A(810, 6) may correspond to a degree of curing of an acrylic resin, a stretching C═C absorbance peak of the acrylic resin prior to thermo-compression bonding, a stretching C═C absorbance peak of the acrylic resin after the thermo-compression bonding, and full curing for 3 hours at 150° C., respectively. As illustrated in the graphs of FIGS. 17 to 19, the degrees of curing after the thermo-compression bonding for 30 seconds at 130° C. were 100% in the acrylic resin, 80.5% in the cation epoxy resin, and 98.5% in the imidazole epoxy resin. The full curing of the cation epoxy resin was checked at equal temperature of 130° C. for DSC measurement for 30 seconds.

Figure 20:
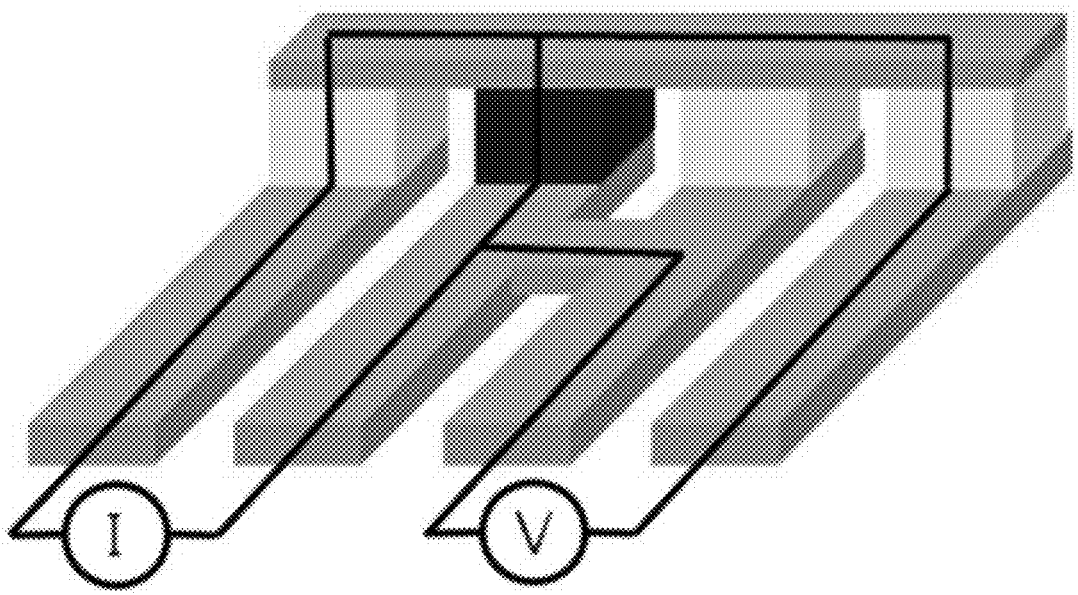
FIG. 20 is a diagram illustrating an example in which electrical contact resistance of a single ACF was measured using a 4-point Kelvin method according to an embodiment of the present disclosure.

An ACF joint morphology of the thermo-compression-bonded sample was obtained by a cross-sectional SEM photo. At the same time, atoms were analyzed using an energy dispersive spectrometer (EDS). Electrical contact resistance of one ACF joint was measured using a 4-point Kelvin method as in FIG. 20.

Figure 21:
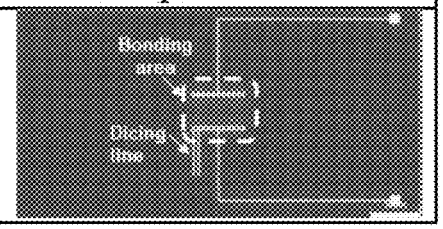
FIG. 21 is a table illustrating the specifications of test means used for a dynamic bending test and corresponding images according to an embodiment of the present disclosure.

A pressure cooker test (e.g., 2 atm with relative humidity of 100% at 121° C.) was performed. The electrical continuity of the ACF joint was monitored every 24 hours up to a maximum of 72 hours. Furthermore, in order to measure situ-daisy chain electrical resistance of the ACF joint during a dynamic bending test in a 7-mm bending radius, another Au coating dummy Si chip having a 4.5 mm×6 mm and 500 μm pitch FPC size was prepared. FIG. 21 illustrates the specifications of test means used for a dynamic bending test and corresponding images. The first 2 electrodes of the FPC were made much longer in order to identify a dicing line after bonding.

After the thermo-compression bonding, an individual array was formed by applying a dicing process. Thereafter, in order to induce given bending of polyimide, that is, a basic material of the FPC, the array was attached to the center of a polyethylene terephthalate (PET) support layer. The dimensions of the PET were 40 mm×60 mm×110 μm.

Figure 22:
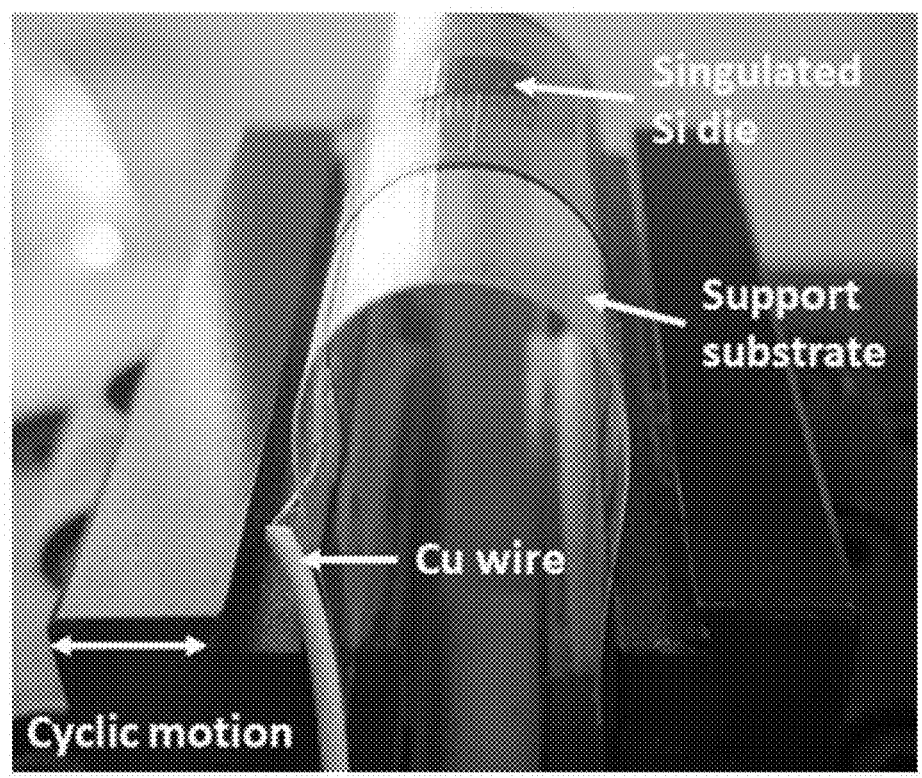
FIG. 22 is an image illustrating an example of a dynamic bending test according to an embodiment of the present disclosure.

In order to connect a digital multi-meter as in FIG. 22, a copper (Cu) wire was soldered, and a change in real-time electrical resistance was monitored. Furthermore, a bending sample was placed on two blocks. The right of the bending sample was fixed, and the left of the bending sample slid left and right and was bent to a bending radius of 19 mm to 7 mm every 1 second, thus making the bending sample convex. Stabilized bending curvature could be obtained during the dynamic bending test using such a method.

Furthermore, in order to examine a local deformation in an ACF interconnection area during the dynamic bending test, a digital image correlation (DIC) method was used. DIC software was used to quantize the deformation by overlapping cross-sectional SEM photos of ACF joints having a flat and bent (R=7 mm) state. A DIC sample was fabricated by polishing the bending sample without molding and spraying a 0.25-μm silica particle solution onto a surface of the bending sample. In the deformation quantization, the deformation applied by mechanical stress is analyzed by tracking the locations of silica particles of the bent sample using the silica location of the flat state sample of the silica particles, randomly dispersed on the ACF joint, as a reference point. A SEM photo of the sample was photographed in the state in which the sample was flat and bent (R=7 mm). A mean value of Von Mises deformations derived into the ACF joint was quantized.

Figure 23:
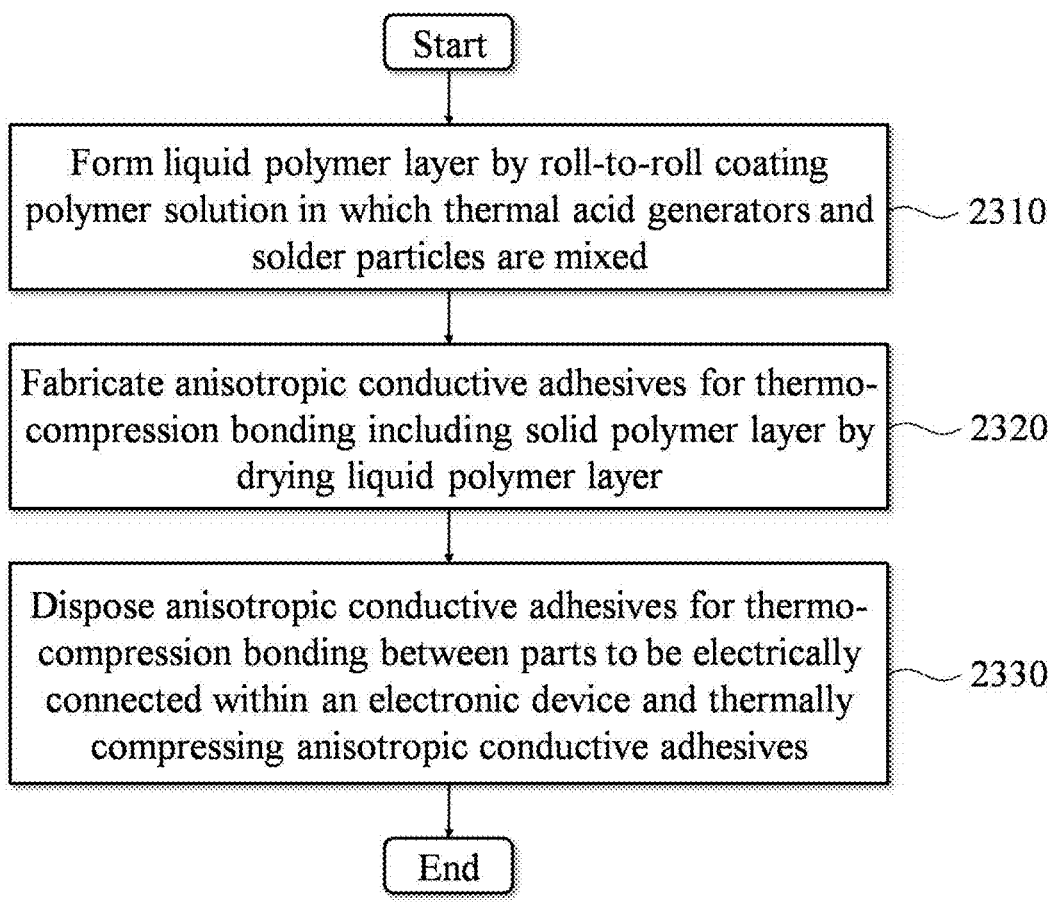
FIG. 23 is a flowchart illustrating an example of a method of connecting electronic parts using the anisotropic conductive adhesives for thermo-compression bonding according to an embodiment of the present disclosure.

FIG. 23 is a flowchart illustrating an example of a method of connecting electronic parts using the anisotropic conductive adhesives for thermo-compression bonding according to an embodiment of the present disclosure. The method of connecting electronic parts according to the present embodiment may include the step 2310 of forming a liquid polymer layer by coating, through a comma roll, a polymer solution In which thermal acid generators and solder particles are mixed, the step 2320 of fabricating anisotropic conductive adhesives for thermo-compression bonding including a solid polymer layer by drying the liquid polymer layer, and the step 2330 of disposing the anisotropic conductive adhesives for thermo-compression bonding between parts to be electrically connected within an electronic device and thermally compressing the anisotropic conductive adhesives.

A temperature for a thermo-compression process using the anisotropic conductive adhesives can be lowered by making less than a specific temperature both an activation temperature of the thermal acid generators and a melting point of the solder particles. For example, if thermal acid generators having an activation temperature of less than 130° C. and solder particles having a melting point of less than 130° C. are used, a temperature for a thermo-compression process using the anisotropic conductive adhesives can be reduced less than 130° C.

In this case, if the anisotropic conductive adhesives for thermo-compression bonding are disposed between parts to be electrically connected within an electronic device and thermo-compression is performed, acid generated from the thermal acid generators can remove solder oxides generated in the solder particles. Solder particles from which the solder oxides have been removed may form a metallurgical joint between the electrodes of the parts. Furthermore, an influence applied to the parts within the electronic device can be reduced by lowering a temperature for the thermo-compression process using the anisotropic conductive adhesives.

An electrical connection material and connection method for a next-generation electronic device that requires excellent electrical connection performance and excellent reliability can be provided by providing the ACAs containing new solder balls to which a thermal acid generator (e.g., flux activator) has been added.

Damage attributable to vibration can be removed and a cost can be reduced because ultrasonic generation equipment is not necessary, compared to the existing ultrasonic bonding method.

While some exemplary embodiments of the present disclosure have been described with reference to the accompanying drawings, those skilled in the art may change and modify the present disclosure in various ways without departing from the essential characteristic of the present disclosure. Accordingly, the disclosed embodiments should not be construed as limiting the technical spirit of the present disclosure, but should be construed as illustrating the technical spirit of the present disclosure. The scope of the technical spirit of the present disclosure is not restricted by the embodiments, and the range of protection of the present disclosure should be interpreted based on the following appended claims. Accordingly, the present disclosure should be construed as covering all modifications or variations derived from the meaning and scope of the appended claims and their equivalents.

What is claimed is:

1. Anisotropic conductive adhesives for thermo-compression bonding, comprising:
   a thermal acid generator, solder particles, and a polymer resin,
   wherein in a thermo-compression process of electrically connecting parts within an electronic device using the anisotropic conductive adhesives for thermo-compression bonding, acid generated from the thermal acid generators due heat in the thermo-compression process removes solder oxides generated from the solder particles due to heat in the thermo-compression process, and the solder particles from which the solder oxides have been removed form a metallurgical joint between electrodes between the parts within the electronic device,
   wherein the thermal acid generator comprises at least one of trifluoromethanesulfonic acid, dinonylnaphthalene disulfonic acid, dinonylnaphthalene sulfonic acid, dodecylbenzenesulfonic acid, perfluorobutanesulfonic acid, and bis(trifluoromethanesulfonyl) imide, and
   wherein an activation temperature of the thermal acid generator is 60° C. or more to less than 240° C., and the acid and a by-product are generated from the thermal acid generator at the activation temperature.

2. The anisotropic conductive adhesives of claim 1, wherein the solder particles comprise particles containing at least one Sn element of Sn, Sn3Ag0.5Cu, Sn0.4Ag57.6Bi, Sn58Bi, and Sn52In or comprise particles coated with the at least one Sn element.

3. The anisotropic conductive adhesives of claim 1, wherein a diameter of each of the solder particles is less than 100 μm.

4. The anisotropic conductive adhesives of claim 1, wherein a melting point of the solder particle is 60° C. or more to less than 240° C.

5. The anisotropic conductive adhesives of claim 1, wherein the polymer resin comprises a thermosetting resin having a solid phase or a liquid phase.

6. The anisotropic conductive adhesives of claim 1, wherein the polymer resin comprises at least one of acrylic resin, cation epoxy resin, and imidazole epoxy resin.

* * * * *